Jan. 8, 1957     J. F. DREYER     2,776,598
MIRROR HAVING A DICHROIC LAYER
Filed April 13, 1951
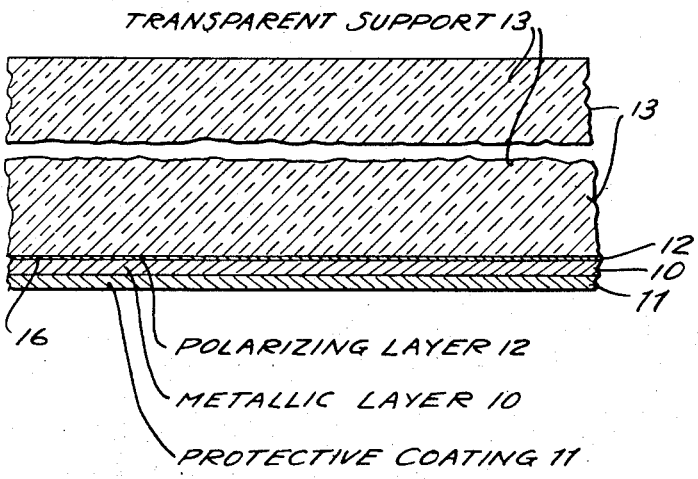
Inventor
JOHN F. DREYER
By
Curtis, Morris + Safford
Attorneys

United States Patent Office 2,776,598
Patented Jan. 8, 1957

2,776,598

MIRROR HAVING A DICHROIC LAYER

John F. Dreyer, Cincinnati, Ohio, assignor to Charles P. Dreyer, Gertrude C. Dreyer, and Lawrence R. Lytle, Cincinnati, Ohio, as trustees Application April 13, 1951, Serial No. 220,849

5 Claims. (Cl. 88—105)

This invention relates to mirrors in general and particularly to devices which reflect polarized light.

Mirrors with polarizing layers applied on their face over the glass are inefficient and give image distortion because of the separation of the polarizing film from the reflecting surface. My own prior Patent No. 2,484,818 describes and claims mirrors made by applying a molecular film of dichroic material and orienting it on a supporting optical surface. The reflection occurs from the surface of the dichroic film. These mirrors, designed primarily for rear view mirrors mounted on the interior of automobiles, tend to give lower reflecting efficiency than is desirable for an external mirror which may be viewed against a bright sky or a sunny landscape. Mirrors for many other purposes likewise require higher reflecting efficiency, but still less than the full efficiency of a reflecting metal surface.

With the ordinary mirrors for such purpose a light absorbing glass is used; and, since the length of the light path through the glass or other absorbing layer is dependent upon its angle to the layer, the image is much brighter for objects perpendicularly facing the mirror and progressively dimmer for those at more oblique angles. I have found that with the polarizing layer used to reduce the intensity of the reflected light this difference between the intensities of perpendicular and oblique reflection are much less.

In order to get the full effect of the dichroic layer used according to my invention, it is important that as much as possible of the reflected light shall penetrate to and be reflected from the metallic (or other opaque mirror) surface so that it passes twice through the dichroic material. To this end my invention contemplates a treatment of the dichroic material to reduce its normal mirror properties.

It is one object of this invention then to provide a rear view mirror for use on the exterior of vehicles. Another object is to provide a method of making a mirror with accurate control of the reflection efficiency and to provide mirrors to any desired reflection efficiency.

Another object is to provide a polarizing cosmetic mirror, wherein the shine on one's face may be accentuated or minimized by putting the mirror at a proper angle to pass or to block light polarized by spectral reflection.

With the foregoing and other considerations in view, I have now provided a mirror wherein the polarizing layer is of minute uniform thickness (e. g. less than one-thousandth of an inch) and is in direct optical contact with the main reflecting surface. Because the reflecting and polarizing layers are so nearly an optical surface, "ghost" images are avoided.

In a more specific aspect, the invention contemplates the use of dye films which will provide uniform reflecting, polarizing, and tinting characteristics, the use of dyes or other materials capable of passing through the nematic state while subject to orienting influences, substantially in accordance with my Patent No. 2,400,877.

My invention also relates to the use of addition agents in such a polarizing film whereby the reflecting character of the dichroic polarizer is minimized.

By applying a free-flowing solution of polarizing material to the surface of a component layer of the mirror I can provide a film of the desired minute and uniform thickness. If the polarizing material is one capable of passing through the nematic phase, the material may be oriented by the method set forth in my above-identified patent, first orienting the molecules of the supporting layer at said surface, as by rubbing or stretching and then applying the liquid film, passing it through the nematic phase and then quickly solidifying. Advantageously, a metallic reflective film is formed directly on the polarizing film, then depositing a metal onto the polarizing film, as by condensation, sputtering, chemical deposition, electrodeposition, etc.

The invention accordingly resides in the steps and in the relations and in the order of one or more of such steps with respect to each of the others, and in the article possessing features, properties, and relations of elements, which are exemplified in the following detailed disclosure, and the scope of the application of which will be indicated in the claims.

For a fuller understanding of the nature and objects of the invention, reference should be had to the following detailed description taken in connection with the accompanying drawing, showing a fragmentary diagrammatic sectional view of a mirror embodying the invention.

The mirror exemplified comprises a metallic reflecting surface 10 which may have a protective coating 11 such as a lacquer, tough paper or plastic film, etc., on its rear surface. In direct and full optical contact with the smooth reflecting front surface of the metallic layer 10 is a polarizing layer 12 of uniformly oriented dichroic material in the form of a film having a minute thickness, in this case less than a thousandth of an inch. This film is composed in the present instance of a material which is capable of passing through the nematic state, and, as exemplified, is a "nematic" dye, i. e. Resorcin Brown, Color Index No. 234. In front of the polarizing film is a suitable transparent support 13, e. g. glass or quartz, polystyrene or methyl methacrylate resin or other transparent support with optically accurate surfaces, one of which is in full optical contact with said polarizing film.

An advantageous method of formation of a mirror in accordance with the invention is:

The surface of a smooth transparent sheet is rubbed so as to orient the surface molecules, as set forth in my patent above identified. Onto the thus oriented surface there is applied by spraying, dipping or flowing a free-flowing solution of a dye capable of passing through the nematic state. This solution is permitted to spread over the surface as shown at 16 so that its surface tension will level it into a very thin uniform film. The film is then dried as set forth in my said patent so that it passes through the nematic state, and then dries to a thin solid film. While in the nematic state the molecules of the dye are uniformly oriented in accordance with the orientation of the molecules of the surface of the transparent support and the dye molecules maintain this orientation in the solid state thus providing the polarizing film 12.

Onto this film 12 there is applied a reflecting metallic layer, as by condensing of aluminum upon the surface of the film 12, e. g., by the well-known high-vacuum-chamber process. This assures reflecting surfaces of maximum spectral perfection and high efficiency, free from those oxides the presence of which is so difficult to avoid when a metal layer is preformed and a polarizing layer applied thereto. Instead of applying aluminum by the high-vacuum-chamber method, silver may, for example, be applied in any of the known mirror-forming formulae, provided only that the chemicals applied for this purpose do not redissolve or destroy the polarizing film. In general the dye films treated with heavy metals, as set forth in my prior Patent No. 2,400,877 are more resistant to such solutions than the film as first formed.

The lacquer coating or other protective back 11 may then be applied to the metal, as indicated in the drawing.

Various dyes and other substances which are capable of being passed through the nematic state to provide a polarizing film, and various modes of application and formation of the various layers, may be employed, all as set forth in my Patents 2,400,877, 2,432,867, 2,481,830, 2,484,818 and 2,524,286.

It is a great advantage of these mirrors that a wide range of colors is available among the dyes of the type set forth. For example, for automobile mirrors a dye reflecting mostly in the yellow green range is desirable; whereas for cosmetic mirrors a dye giving a peach color is desirable.

Although in the drawing and in the above description I have shown a preferred embodiment of my invention and various alternatives and modifications thereof, it is understood that these are not intended to be exhaustive nor limiting of the invention, but on the contrary are given with a view to illustrating and explaining the principles of the invention and their embodiment for practical use, in order that others skilled in the art may be enabled to adapt and modify them in numerous embodiments and modifications, each as may be best adapted to the conditions of any particular use.

Pursuant to the invention mirrors may be provided having any desired efficiency up to 90% of the theoretical capacity for the reflection of polarized light; i. e. it will reflect 45% of the impinging light.

I claim:

1. The method of forming a mirror which comprises providing a transparent layer, giving the material at the surface of said layer a desired orientation, spreading on said surface a free-flowing solution of a dichroic material capable of passing through the nematic state, passing said material through the nematic state while under the influence of said oriented surface to orient the molecules of said dichroic material in conformity to said desired orientation at the surface of said layer, and solidifying said dichroic material while the molecules thereof remain oriented, and depositing a mirror reflecting material on the resulting dichroic layer.

2. The method of forming a mirror which comprises spreading evenly over an optically accurate surface of a transparent material a free-flowing solution of a dye capable of passing through the nematic state, bringing the dye through the nematic state under orienting conditions and bringing it into the solid state in an oriented condition, and depositing a mirror metallic layer to the film thus formed.

3. The method of forming a mirror which comprises orienting the molecules of an optically flat surface of a sheet of transparent material, spreading on the oriented surface a solution in a free-flowing liquid of a dichroic material which will pass thru the nematic state, drying the solution under conditions such that the material will be oriented while passing thru the nematic state to provide a thin polarizing film of dichroic material on the surface, and depositing a reflecting metallic layer thereupon to provide a mirror reflecting surface.

4. A method as set forth in claim 3 wherein the metallic layer is formed by depositing metal atoms in a vacuum.

5. A mirror comprising a sheet of glass having optically flat surfaces, a substantially uniform thin film of dichroic polarizer in substantially uniform optical contact with one surface of said glass, which dichroic polarizer has been produced by flowing a solution of a dichroic dye onto said surface and passing said dye solution through the nematic state while orienting the molecules of said dye whereby the polarizing film adheres in uniform optical contact to said surface of the glass, and a metallic mirror reflecting layer disposed in uniform optical contact with and adhering to said film.

References Cited in the file of this patent

UNITED STATES PATENTS

| | | |
|---|---|---|
| 2,167,899 | Marks | Aug. 1, 1939 |
| 2,252,324 | Land | Aug. 12, 1941 |
| 2,366,687 | Osterberg | Jan. 2, 1945 |
| 2,382,432 | McMannus et al. | Aug. 14, 1945 |
| 2,398,506 | Rogers | Apr. 16, 1946 |
| 2,400,877 | Dreyer | May 28, 1946 |
| 2,411,955 | Colbert et al. | Dec. 3, 1946 |
| 2,443,196 | Raines et al. | June 15, 1948 |
| 2,466,625 | Ulmer | Apr. 5, 1949 |
| 2,484,818 | Dreyer | Oct. 18, 1949 |
| 2,524,286 | Dreyer | Oct. 3, 1950 |